(12) United States Patent
Williams (10) Patent No.: US 9,264,924 B2
(45) Date of Patent: Feb. 16, 2016

(54) SIGNAL NOISE ESTIMATION

(71) Applicant: Cable Television Laboratories, Inc., Louisville, CO (US)

(72) Inventor: Thomas H. Williams, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 96 days.

(21) Appl. No.: 13/931,841

(22) Filed: Jun. 29, 2013

(65) Prior Publication Data

US 2014/0254407 A1 Sep. 11, 2014

Related U.S. Application Data (60) Provisional application No. 61/773,940, filed on Mar. 7, 2013.

(51) Int. Cl.
*H04W 24/06* (2009.01)
(52) U.S. Cl.
CPC .................................... *H04W 24/06* (2013.01)

(58) Field of Classification Search
None
See application file for complete search history.

(56) References Cited

U.S. PATENT DOCUMENTS

| | | | | |
|---|---|---|---|---|
| 6,807,147 | B1* | 10/2004 | Heinonen et al. | 370/208 |
| 6,952,394 | B1* | 10/2005 | Kim et al. | 370/208 |
| 2013/0114659 | A1* | 5/2013 | Murakami et al. | 375/224 |
| 2014/0056337 | A1* | 2/2014 | Kesling et al. | 375/219 |

OTHER PUBLICATIONS

S. Werner, et al, Combined frequency and time domain channel estimation in mobile MIMO-OFDM systems, IEEE ICASSP 2006.*

* cited by examiner

*Primary Examiner* — Hoon J Chung
*Assistant Examiner* — Zhensheng Zhang
(74) *Attorney, Agent, or Firm* — Great Lakes Intellectual Property, PLLC (57) ABSTRACT

Estimation of noise within signaling is contemplated. The noise estimation may be beneficial in detecting noise within signaling in order to facilitate error correction or other corrective measures without having to process transmitted data being transmitted within the signaling. The noise estimation may be based on pilot tones included within frequency division multiplexed signaling.

20 Claims, 7 Drawing Sheets

SIGNAL NOISE ESTIMATION

CROSS-REFERENCE TO RELATED APPLICATIONS

This application claims the benefit of U.S. provisional Application No. 61/773,940 filed Mar. 7, 2013, the disclosure of which is incorporated in its entirety by reference herein.

TECHNICAL FIELD

The present invention relates to estimating signal noise, such as but not necessarily limited to estimating noise and/or other impairments within frequency division multiplexed signaling.

BACKGROUND

U.S. patent application Ser. No. 13/538,456, entitled Interleaved Signaling, and U.S. patent application Ser. No. 13/841,313, entitled Orthogonal Signal Demodulation, the disclosures of which are hereby incorporated by reference in their entireties, relate to the transmission, modulation and demodulation of data through the use of various signaling techniques. The signaling described in the incorporated patent applications, as well as other types of wired and wireless signaling, may be susceptible to impairments added to the transmitted signal as it traverses a signal path. Particularly problematic impairments may result from random noise and/or burst noise. Random noise may be continuous in the time domain and generally flat or "white" in the frequency domain. Burst noise may be strong in amplitude, but relatively short in duration, which may include the noise being wide in frequency. Burst noise may be caused by switching in electrical circuits, such as switching regulated power supplies, switching inductive loads with mechanical contacts, automotive ignitions, and power supplies in compact florescent lamps, etc. Forward error correction (FEC), Reed-Solomon (RS) codes, low-density parity codes (LDPC) and other techniques, such as but not necessarily limited to those described in the incorporated patent applications, may be used to ameliorate channel errors resulting noise related impairments. The use of such codes requires access to the transmitted data and/or an ability to process transmitted signaling at a data level. Additionally, when faced with a strong noise, such as but not necessarily limited to a noise burst, such correction techniques may be may overpowered, resulting in uncorrected signaling and a need for retransmission, if possible.

One non-limiting aspect of the present invention contemplates a need to characterize or estimate the noise related impairments in order to facilitate additional corrective or compensatory measures, optionally in addition to the measures commonly available in the art and/or without having to identify data or process data included within the transmitted signaling. The ability to characterize and/or estimate noise or other signaling impairments without having to identify or process transmitted data can be beneficial, particularly when the noise impairments overlap transmitted signaling in both the time and frequency domains.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
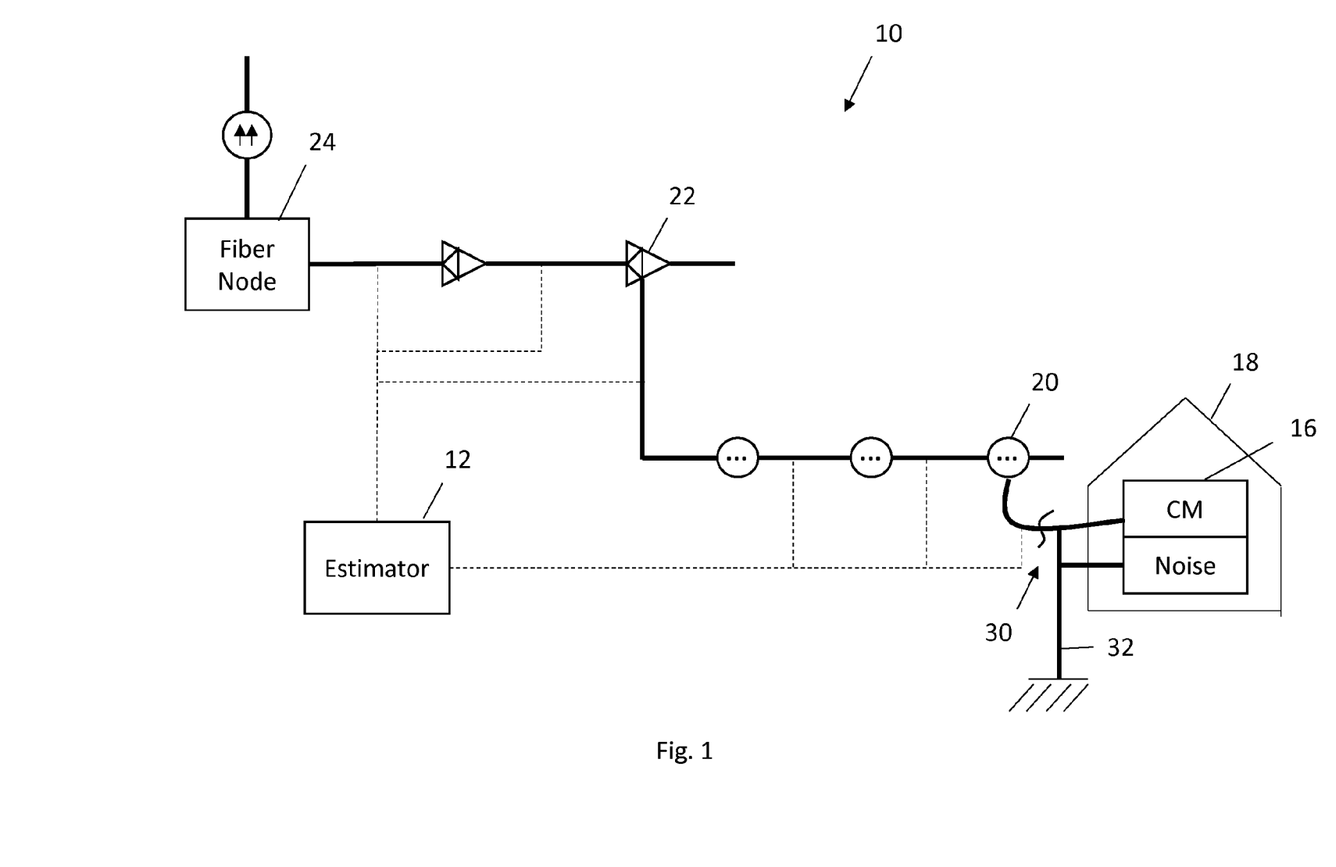
FIG. 1 illustrates a system for estimating signal noise in accordance with one non-limiting aspect of the present invention.

FIG. 1 illustrates a system 10 for estimating signal noise in accordance with one non-limiting aspect of the present invention. The system 10 may include an estimator 12 configured to facilitate estimating or otherwise characterizing noised impairments within transmitted signaling. The estimator 12 is shown to be a standalone feature for exemplary non-limiting purposes as the estimator and/or multiple estimators may be deployed within the system and/or incorporated into other system devices, such as a Cable Modem (CM) 16 or a Cable Modem Termination System (CMTS) not illustrated. The transmitted signaling may correspond with any wired and/or wireless signaling, and is predominately described with respect to transmitted signaling carried over a Hybrid fiber-coaxial (HFC) transport system. The HFC system may correspond with the transport systems described in the incorporated patent applications and/or any other wired and/or wireless transport systems where it may be difficult to accurately estimate noise for the purposes of implementing corrective or compensatory measures. The estimator 12 may include an application and/or a computer-readable medium having non-transitory instructions, operable with a processor, to facilitate processing measured and/or sampled transmitted signaling, including capabilities sufficient to facilitate estimating noise impairments within the signaling in accordance with the processes contemplated herein. The estimator 12 may identify, sample or otherwise assess the transmitted signaling as a function of sensors positioned throughout the system 10 and/or as a function of information provided from one or more of the system components.

The system 10 illustrates a block diagram of a signal source 16, a signal path with additive noise and a receiver. In this example, an upstream signal is shown for non-limiting purposes to originate from the signal source being the Cable Modem (CM) 16 in a home 18 such that a 5-42 MHz frequency band passes out of the home through a drop cable into a tap 20. From the tap 20, the signal travels through the cable plant, through more taps and coaxial cable, 2-way amplifiers 22 and a fiber node 24. At the fiber node 24, the electrical signal is converted to an optical signal and relayed to a hub site where a receiver receives the upstream signal and demodulates it. In the event the home has a break 30 in the shield of the drop coaxial cable, which could be caused for example by animal chews or corrosion on the wire, signal noise impairments may be introduced. This noise impairment may originate with the home's electrical system and ground rod 32 where the noise impairment enters onto the shield of the drop cable and travels to the shield break 30 where it adds into the drop cable to become combined with the upstream signal. Often the noise bursts of this type may be short in duration but strong in level such that the noise bursts may corrupt upstream signals, especially orthogonal frequency division multiplexing (OFDM) signals. (This figure could similarly represent a wireless system, with a transmitting antenna, a receiving antenna, and an additive burst of noise propagating through the air.)

Figure 2:
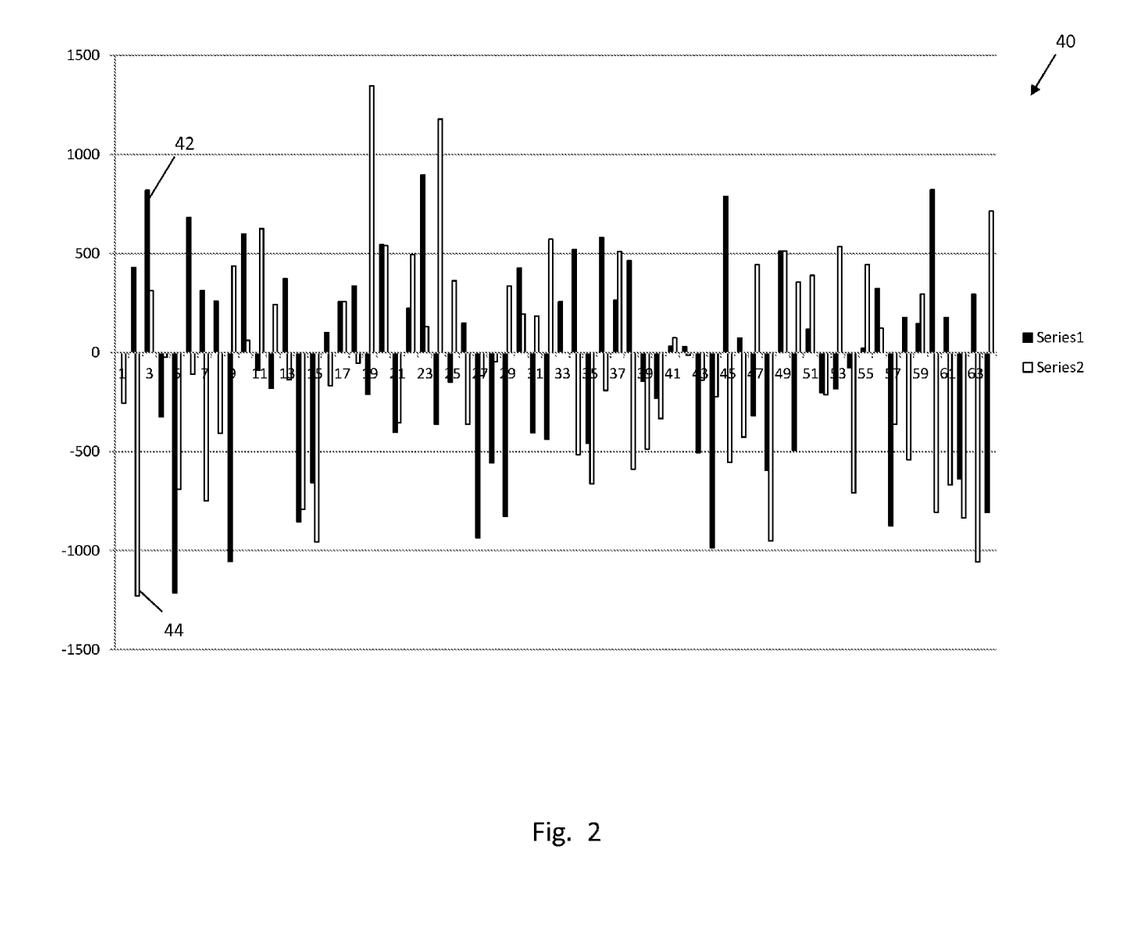
FIG. 2 illustrates a sample of OFDM signaling in accordance with one non-limiting aspect of the present invention.

FIG. 2 illustrates a sample 40 of OFDM signaling as contemplated by one non-limiting aspect of the present invention. The OFDM signaling, or OFDM burst, may correspond with signaling sampled with the estimator 12 or otherwise provided thereto for processing. The sample 40 is illustrated within the time domain according to voltage (vertical axis) and time (horizontal axis) with the first series corresponding with real values and the second series corresponding with imaginary values. The voltage may be referenced as millivolts and the time may be referenced as symbols or other time units, which for exemplary non-limiting purposes is shown to correspond with 64 symbols. OFDM signals are comprised of frequency-domain subcarriers (or frequency domain symbols), where the number of subcarriers may be two raised to some integer number, such as 64, 512, 1024, or 4096. In the time domain, component subcarriers are sine and cosine basis functions employing a cyclic prefix (or guard interval) which provides immunity to echoes with an associated time delay. By having an integer number of cycles, the subcarriers of a composite signal maintain orthogonality to each other. The illustrated OFDM signaling is shown to include 64 symbols comprising QPSK (quadrature phase shift keying) samples (real (I) and imaginary (Q) components). While the sample 40 is shown to be taken from OFDM signaling, the present invention is not necessarily limited to OFDM signaling and fully contemplates estimating noise and/or other impairments in other types of frequency division multiplexed signaling. The sample 40 is shown to include two samples 42, 44 contaminated with a brief duration noise burst.

Figure 3:
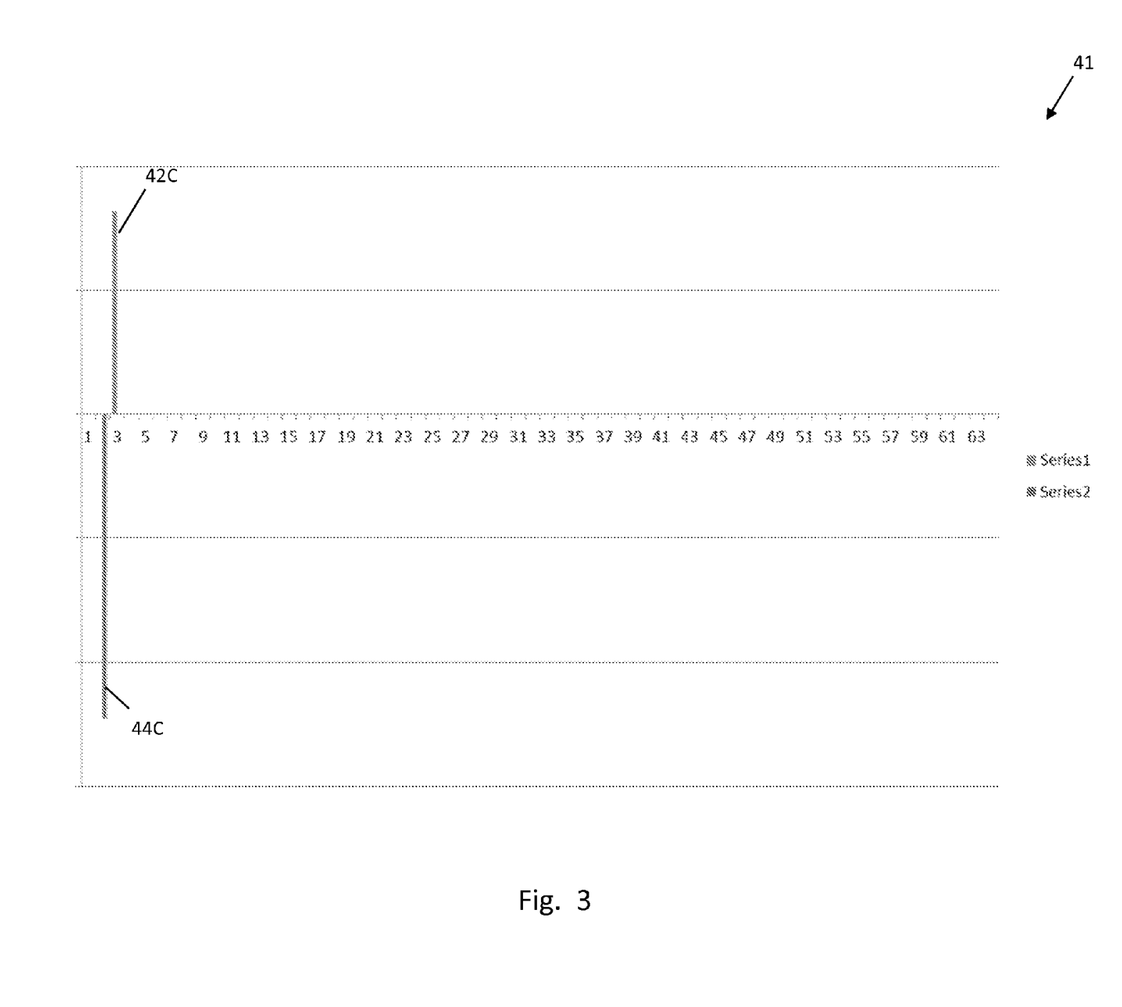
FIG. 3 illustrates a noise in the time domain in accordance with one non-limiting aspect of the present invention.

FIG. 3 illustrates the contaminating burst 41 as time samples 42C, 44C with the remaining portions of the sample (pilot and data subcarriers) being removed for simplicity. The voltage associated with the noise bursts is shown to not be larger than the remaining samples for exemplary non-limiting purposes, as the noise bursts may correspond with various voltage levels and need not necessarily correspond with a single having the largest voltage. As shown in FIG. 2, the noise bursts may be obfuscated or otherwise difficult to identify within the sample 40. In the absence of the noise bursts being known, one may experience difficulty in determining the noise within the sample 40. The inability to easily differentiate noise from properly transmitted signaling can become particularly problematic in the event the impairment fails to generate an extreme voltage or other extreme identifying sample. In other words, the differentiation difficulty may become particularly problematic when the noise appears as properly or non-impaired transmitted signaling, i.e., when the noise appears to be substantially similar to the properly transmitted signaling. The present invention contemplates estimating or otherwise characterizing noised impairments and/or other impairments within transmitted signaling in order to ease differentiating impairments from properly transmitted signaling. One non-limiting aspect the present invention contemplates achieving the desired impairment estimation as a function of pilot tones carried within the transmitted signaling.

The pilot tones may correspond with signaling added to the transmitting signaling in order to facilitate supervisory, control, equalization, continuity, synchronization, signal acquisition, and/or reference related operations. The various system components may be configured to identify the pilot tones from other transmitting signaling according to prearranged sequences or predetermined magnitude and/or phase values assigned to the pilot tones. In this manner, the pilot tones may be identified by the system components without having to identify or process data modulated or encoded with the transmitted signaling as the pilot tones may be identified as a function of pre-assigned signaling parameters and characteristics. Optionally, the pilot tones may be devoid of data or other information associated with facilitating implementation of the supervisory, control, equalization, continuity, synchronization or reference related operations intended to be performed as a function thereof. Pilot tones may be modulated in a pre-known sequence, such as a pseudo-random binary sequence (PRBS) as a design consideration. The system components may be programmed separately to implement the pilot tone related controls as a function of information encoded separately from the pilot tones, i.e., as a function of data carried in other portions of the transmitted signaling and/or previously provided or embedded on the system components. In this manner, the system components or other elements in contact with the transmitted signaling may simply identify the pilot tones, as a opposed to demodulating the pilot tones, in order to instigate the related synchronization, etc.

Depending on the particular transmission characteristics of the system 10, the use of the pilot tones may vary. One non-limiting aspect of the present invention contemplates the system 10 being configured to facilitate signaling transport according to the Data Over Cable Service Interface Specification (DOCSIS), the disclosure of which is hereby incorporated by reference in its entirety. Optionally, the DOCSIS related signaling may be supplemented with pilot tones and the processing of the pilot tones noted herein to facilitate noise estimation. The pilot tones for exemplary non-limiting purposes are described herein as being included within every $8^{th}$ subcarrier/symbol such that the pilot tones are intersperse between data symbols within the OFDM signaling 40 illustrated in FIG. 2. The data symbols/subcarriers may be differentiated from the pilot tones based on the sequence of symbols, i.e., the system components (estimator 12, receiver, etc.) may be instructed to identify the pilot tones as the portion of the transmitted signaling occurring at every $8^{th}$ subcarrier/symbol or at any other repeating or predefined interval defined by a specification.

Figure 4:
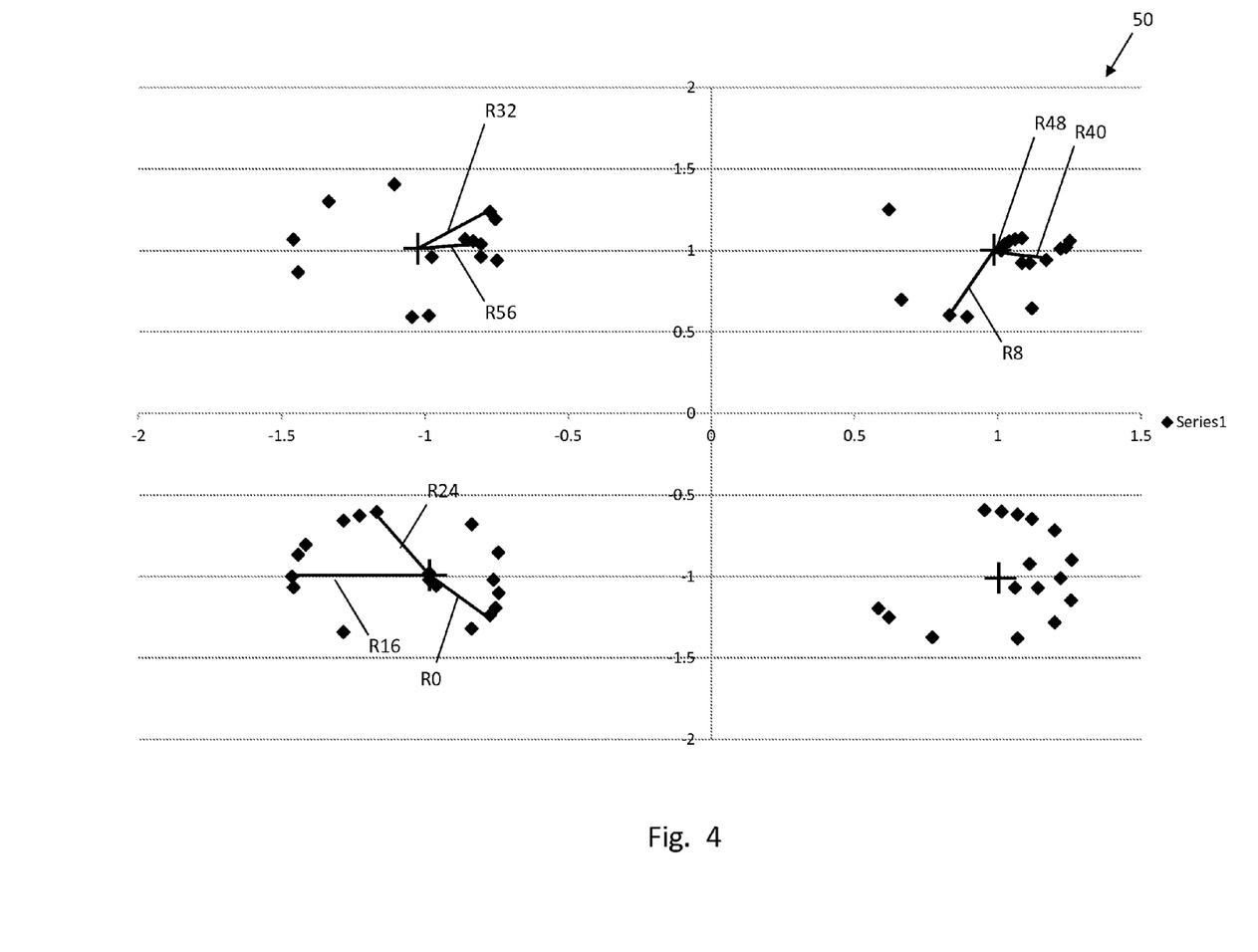
FIG. 4 illustrates a graph of component subcarriers in accordance with one non-limiting aspect of the present invention.

FIG. 4 illustrates a graph 50 of component subcarriers in accordance with one non-limiting aspect of the present invention. The graph 50 illustrates an I-Q constellation derived as a function of performing a fast Fourier transform (FFT) on the OFDM signaling 40 shown in FIG. 2. The graph 50 illustrates all 64 QPSK points (illustrated as diamonds) of the OFDM signal 40 with an exemplary eight pilot tones referenced with error vectors R0, R8, R16, R24, R32, R40, R48, R56 (numbers representing corresponding subcarrier in signal 40) relative to corresponding complex values of 1+j1, 1−j1, −1+j1, or −1−j1. Because of the burst energy (impairment) contamination, each of the pilot tone symbols has been offset from its ideal location (within the spread) by amount corresponding with the error vectors. As the frequency of the subcarrier increases, the offset vectors R rotate and may change length, causing the constellation points to produce a pattern. The known positioning of the pilot tones allows the graph to represent impairments occurring over time as a function of the error vector at which each pilot tone is offset from its ideal location, i.e., the location specified according to its pre-defined magnitude and phase. The estimator 12 or other system component may be configured to sample the transmitted signal in order to facilitate generating the graph. The estimator 12 may then determine the influence of the noise impairment as a function of the offset induced to the pilot tones.

In some systems, pre-distortion is used to provide distortion to a signal at the transmitter so that it will arrive at the receiver free of the effects of linear distortion. This system is typically used on Cable upstream transmissions. In other systems, equalization is performed in the receiver. In this case the estimation of the burst noise can be done after equalization is performed in the receiver.

Figure 5:
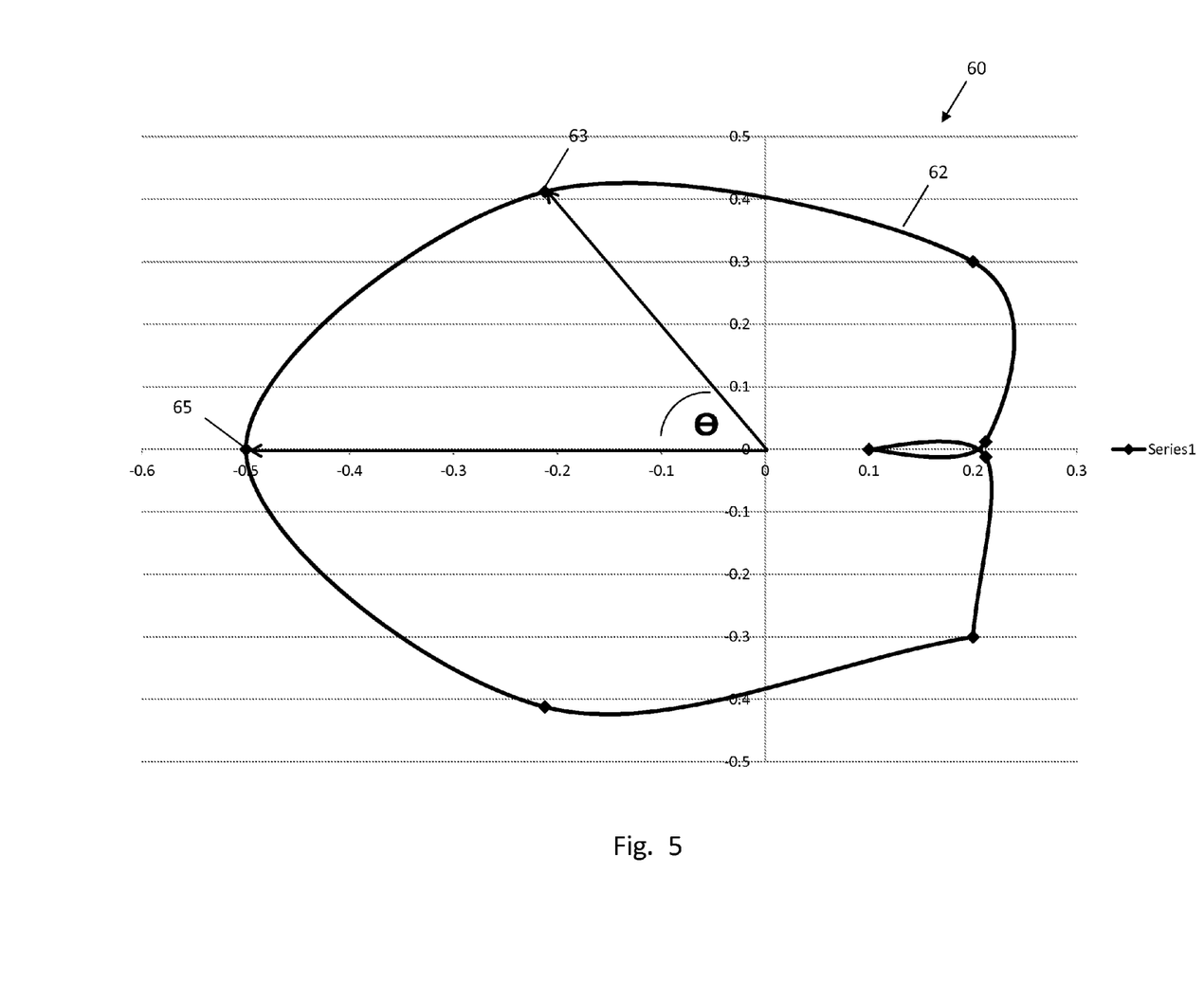
FIG. 5 illustrates a noise interpolation in accordance with one non-limiting aspect of the present invention.

FIG. 5 illustrates a graph 60 of a noise interpolation in accordance with one non-limiting aspect of the present invention. The graph 60 illustrates interpolation of the error vectors illustrated within FIG. 5 with their ideal energy removed, i.e., by graphing the error vectors minus the pilot vector I and Q values. The influence of the noise impairment on the OFDM signaling may be represented relative to an interpolation line 62 generated by performing a polar interpolation, linear interpolation or other suitable interpolation of the datums (shown as diamonds) associated with the pilot tone error vectors. Other smoothing interpolations may be polynomial interpolation, spline interpolation, or under-sampling followed by a convolution with a filtering function. As shown, the interpolation line 62 provides a pattern within the frequency domain that may be used to graphically represent the underlying mathematical representations associated with the error vectors, both on pilot subcarriers and data subcarriers. The positioning (inferred values) for the effect of the noise on the interspersed data subcarriers may be determined based on relative positioning of each subcarrier along the interpolation line. In this case the interpolation line would be divided into 7 segments for the 7 data subcarriers between every $8^{th}$ pilot carrier.

Figure 6:
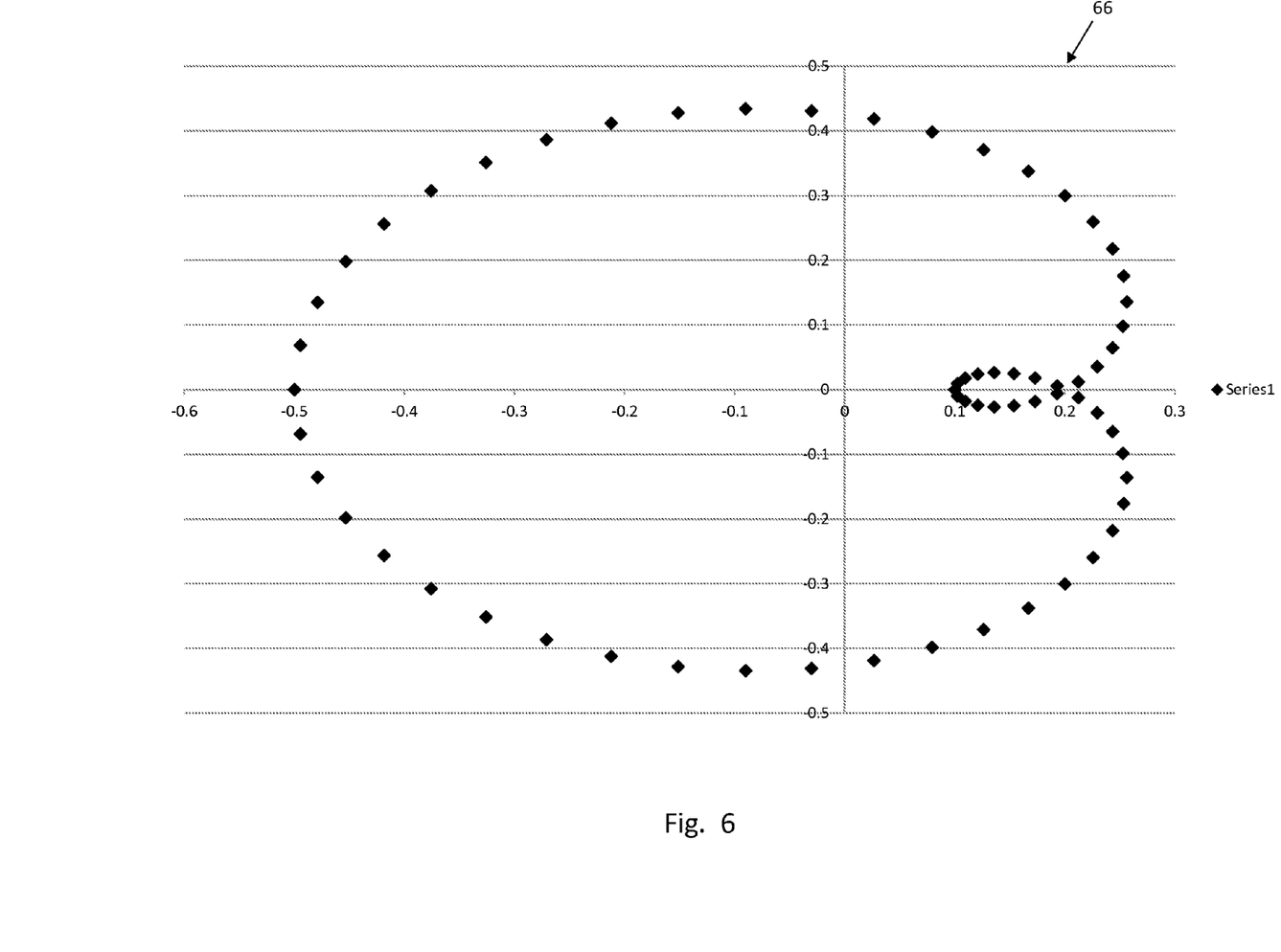
FIG. 6 illustrates a noise in the frequency domain in accordance with one non-limiting aspect of the present invention.

FIG. 6 illustrates a burst noise graph 66 of the noise illustrated in FIG. 3 to the frequency domain. The burst noise graph illustrates an ideal conversion of the noise to the frequency domain in order to demonstrate the closeness of the interpolation estimation provided by the graph shown in FIG. 5. The interpolation line is generally similar to the pattern illustrated within FIG. 6, indicating a closeness and accuracy of the estimate. The pattern shown in FIG. 6 illustrates datums (shown as diamonds) for each of the 64 subcarriers included within the OFDM sample. The datums may be used to represent the influence of noise on each subcarrier as a function of an offset from the center of the graph. The interpolation line shown within FIG. 5 may be used to provide a similar estimation of the noise influence for each subcarrier based on subcarrier positioning along the interpolation line.

A representation of the noise influence on each subcarrier (FIG. 5) is thus shown to be an effective estimation of the actual noise (FIG. 6) within the sample. The offset induced to each pilot tone relative to the data subcarriers, therefore, can provide a valuable tool in estimating the noise influence on the data subcarriers between pilots. The interpolation may be used to take corrective action by subtracting the noise vector estimates from data subcarriers interspersed between the pilot tones. In this manner, by identifying the offset or error associated with a comparison of the actual position of the pilot tones relative to the known or predefined positioning of the pilot tones, an offset induced by noise impairments may be identified and interpolated relative to the intersperse data symbols in order to identify the influence of the noise impairments. This estimation of the noise impairment may be used to facilitate corrective control and measures, which may be implemented without having to process the data symbols or otherwise manipulate the encoder modulated data, such as in the manner required in order to perform FEC and/or Reed-Solomon adjustments. A measure of the spread of data symbols from their ideal positions that is known is the art is Modulation Error Rate (MER). If an accurate estimate of a burst noise impairment to a block of OFDM data symbols has been made, the MER will be decreased after the error estimate has been subtracted from the data symbols.

Due to a property of the FFT, a burst arriving just before or just after t=0 (on left edge of plot in FIG. 2) will produce a frequency domain plot as illustrated in FIG. 5 that is easy to interpolate because there is only a small relative phase angle θ between any two adjacent pilot symbols, such as pilot symbols 63 and 65. A burst that arrives much earlier or much later than t=0 will produce a phase difference that is larger, making interpolation more difficult. A solution to perform a circular (cyclic) rotation of the time samples (i.e. a delay), so that the burst is moved to at or near t=0, perform the interpolation, and then undo the rotation on the interpolated samples. Thus the optimal cyclic rotation (time delay) can be estimated as the delay that causes the least phase angle variation in the frequency domain.

Figure 7:
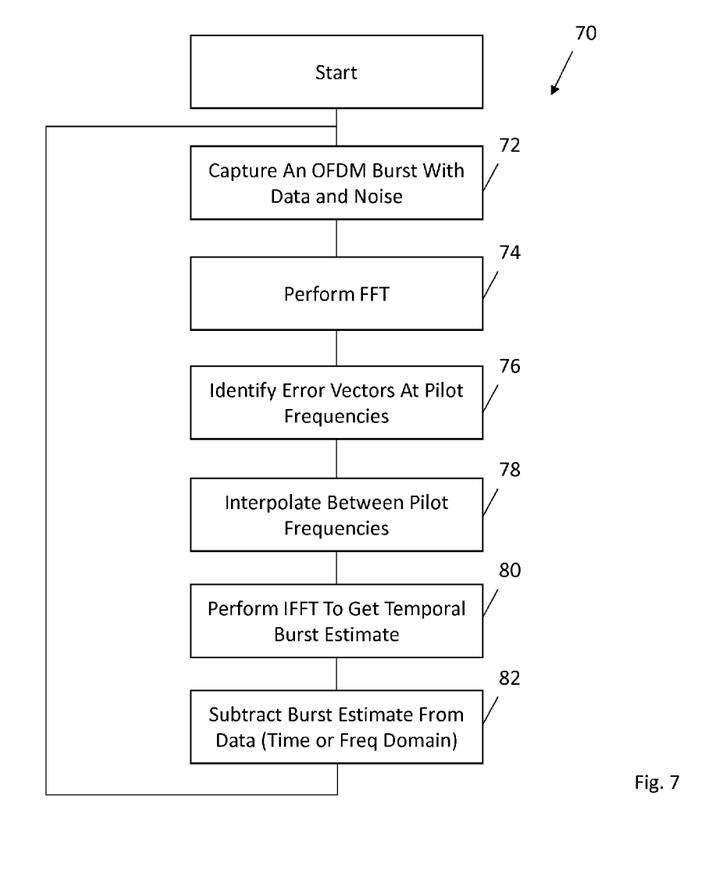
FIG. 7 illustrates a flowchart of a method for estimating noise in accordance with one non-limiting aspect of the present invention.

FIG. 7 illustrates a flowchart 70 of a method for estimating noise in accordance, with one non-limiting aspect of the present invention. The method is predominately described with respect to estimating noise or other impairments within an OFDM burst, however, the present invention is not necessary so limited and fully contemplates facilitating estimating noise with other types of signals and/or signaling bursts. The method may be embodied in a computer-readable medium, an application, computer program product or other feature having capabilities sufficient to facilitate instructing and/or performing the operations contemplated herein. The noise estimation may be beneficial in characterizing noise or other impairments within virtually any type of wired and/or wireless signaling, such as that but not necessary limited to signaling carried within the HFC system described above. The impairment estimation may be performed based on pilot tones or other known signaling patterns, waveforms, sequences and/or other signaling included within the OFDM burst or other sampled signaling. Optionally, an interpolation may be generated as a function of differences between the expected and actual characteristics of pilot tones in order to estimate the impairment without having to process or otherwise adjust data encoded for transport within the transmitted signaling.

Block 72 relates to capturing a sample of OFDM signaling including data, pilots, and noise such that a need exists to estimate the noise in order to properly decode or identify the data for desired processes. The sample may be presumed to include pilot tones or other predefined signaling characteristics to facilitate synchronizing various signaling processing related operations. The sample may be captured with the estimator and/or any other device having capabilities sufficient to measure or otherwise assess the transmitted signaling carried within the above described HFC system and/or capabilities sufficient to otherwise capture the transmitted signaling, e.g., a wireless receiver or other interceptor could be used to facilitate measuring the transmitted signaling. Block 74 relates to performing and FFT on the sample in order to facilitate converting the captured signaling from a time domain to a frequency domain. The conversion to the frequency domain may be beneficial in identifying the subcarriers or symbols of the sample intended to transport the pilot tones relative to the other subcarriers or symbols of the sample intended to carry the data. Optionally, rather than performing the FFT on the entire OFDM burst, the FFT may be performed to just produce magnitude and phase values on every 8th subcarrier or other predefined interval used to designate portions of the OFDM signaling associated with pilot tones (see FIG. 3). Likewise a discrete Fourier transform can produce an equivalent result.

Block 76 relates to identifying error vectors at pilot frequencies associated with the pilot tones. The error vectors may correspond with the offset or radius (R) illustrated in FIG. 3 to reflect an amount by which the measured pilot tones deviate from the predefined pilot tones, i.e., additive distortion associate with each pilot tone. The error vectors may also correspond with other measurable references sufficient to facilitate indicating differences between pilot tones input into the transmitted signaling and those actually measured, i.e., those influenced with the noise impairment. Block 78 relates to interpolating between the pilot frequencies. The interpolation may correspond with adjusting the data symbols or non-pilot tone portions of the OFDM burst relative to the pilot tones intersperse their between. Block 80 relates to performing an inverse fast Fourier transform (IFFT) on the frequency burst (OFDM burst converted with the FFT in Block). The IFFT may be used to convert the frequency burst to generate a temporal burst estimate. Block 82 relates to subtracting the temporal burst estimate from the OFDM signaling in order to remove noise from the OFDM signaling, thereby generating a filtered sample or an unimpaired representation of the OFDM signal.

As supported above, one non-limiting aspect of the present invention contemplates use of additive burst energy on OFDM pilot subcarriers to estimate burst noise in a channel carrying an OFDM transmission. The estimated burst energy may be subtracted from the data-carrying OFDM subcarriers in the frequency domain, improving Modulation Error Ratio (MER) and lowering the error rate.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for estimating noise within orthogonal frequency division multiplexing (OFDM) signaling, the OFDM signaling including a plurality of subcarriers, a portion of the subcarriers being encoded with data and a portion of the subcarriers being encoded with pilot tones, the pilot tones being interspersed between the data, the data having variable values and the pilot tones having predefined values, the method comprising:
   capturing a sample of the OFDM signaling;
   identifying an error vector for each pilot tone included within the sample, each error vector representing the corresponding pilot tone as a datum having a complex value; and
   interpolating the error vectors into an interpolation line sufficient as and estimation of a noise within the sample, the interpolation line including inferred intermediate values derived for each data subcarrier from interpolating the datums.

2. The method of claim 1 further comprising converting the sample from the time domain to the frequency domain, and thereafter, interpolating the error vectors within the frequency domain.

3. The method of claim 2 further comprising representing the noise within the frequency domain.

4. The method of claim 3 further comprising converting the interpolation line from the frequency domain to the time domain, thereby representing the noise within the time domain.

5. The method claim 4 further comprising generating a filtered sample of the sample by subtracting the noise as represented within the time domain from the sample.

6. The method claim 1 further comprising determining noise impairment for each subcarrier of the sample encoded with data to approximate an offset associated with the corresponding one of the intermediate values.

7. The method of claim 1 further comprising determining the complex values to be sufficient for representing an angle for each corresponding pilot tone within the interpolation.

8. The method claim 7 further comprising adjusting a time delay of the sample if anyone of the angles is greater than a predefined threshold, and thereafter, generating the interpolation as a function of the error vectors resulting from the time delay.

9. A non-transitory computer readable medium having a plurality of non-transitory instruction operable with a processor and sufficient for estimating noise within orthogonal frequency division multiplexing (OFDM) signaling, the OFDM signaling including a plurality of subcarriers, a portion of the subcarriers being data subcarriers encoded with data and a portion of the subcarriers being pilot tones encoded with predefined values, the non-transitory instructions being sufficient for:
   determining a first ample of the OFDM signaling captured within the time domain;
   converting the first sample to a second sample within the frequency domain;
   identifying an error vector for each pilot tone within the second sample, each error vector representing a datum for the corresponding pilot tone as a complex value; and
   interpolating the error vectors into an interpolation line sufficient to estimate a noise within the OFDM signaling, the interpolation line including inferred intermediate values derived for each data subcarrier from interpolating the datums.

10. The non-transitory computer-readable medium of claim 9 further comprising non-transitory instructions sufficient for graphically depicting the interpolation line to represent the noise within the frequency domain.

11. The non-transitory computer-readable medium claim 10 further comprising non-transitory instructions sufficient for determining noise impairment for each data subcarrier according to a position of the inferred intermediate values for the corresponding data subcarrier along the interpolation line.

12. The non-transitory computer-readable medium of claim 10 further comprising non-transitory instruction sufficient for converting the interpolation line from the frequency domain to the time domain to generate an estimation of the noise within the time domain.

13. The non-transitory computer-readable medium claim 12 further comprising non-transitory instructions sufficient for subtracting the estimation from the first sample to generate a filtered sample of the first sample.

14. The non-transitory computer-readable medium of claim 10 further comprising non-transitory instructions sufficient for determining an angle for each data represented within the plot.

15. The non-transitory computer-readable medium claim 14 further comprising non-transitory instructions sufficient for applying a time delay to the first sample if any one of the angles is greater than a predefined angle prior to converting the first sample to the second sample.

16. The non-transitory computer-readable medium of claim 15 further comprising non-transitory instructions sufficient for determining the predefined angle is 45°.

17. A computer program product embodied in a non-transitory computer-readable medium having non-transitory instructions, operable with a processor, sufficient to facilitate estimating noise within multiplexed signaling, the signaling including a plurality of data subcarriers encoded with data and a portion of the subcarriers being pilot tones encoded with predefined values, the non-transitory instruction being sufficient for:

capturing a first sample of the signaling within the time domain;

converting the first sample to a second sample within the frequency domain;

identifying an error vector for each pilot tone within the second sample, each error vector representing a datum for the corresponding pilot tone as a complex value; and interpolating the error vectors into an interpolation lines sufficient to estimate a noise within the signaling, the interpolation line including inferred intermediate values derived for each data subcarrier from interpolating the datums.

18. The non-transitory computer-readable medium of claim 17 further comprising non-transitory instructions sufficient for determining noise impairment for each subcarrier encoded according to a position of the corresponding subcarrier relative to the corresponding inferred intermediate value.

19. The method of claim 1 further comprising determining a noise effect on each data subcarrier according to relative positioning of each data subcarrier to the corresponding one of the inferred intermediate values.

20. The method of claim 1 further comprising determining the datum for each error vector by subtracting I and Q values to remove ideal energy.

\* \* \* \* \*